Mar. 3, 1925.
J. TOKARCZIKE
CONNECTING ROD
Filed Aug. 11, 1923
1,528,171
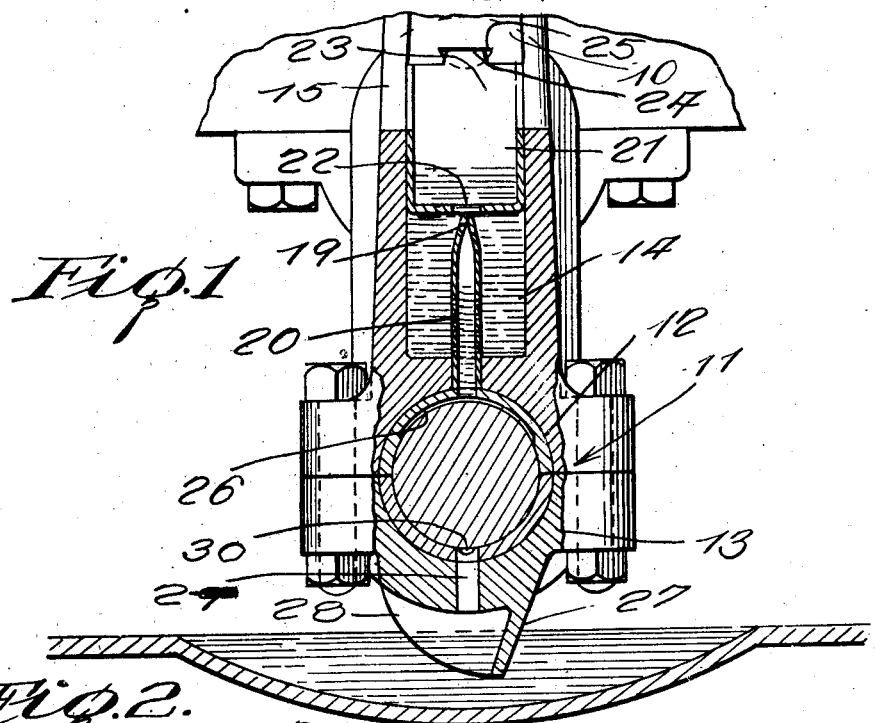
Fig.1
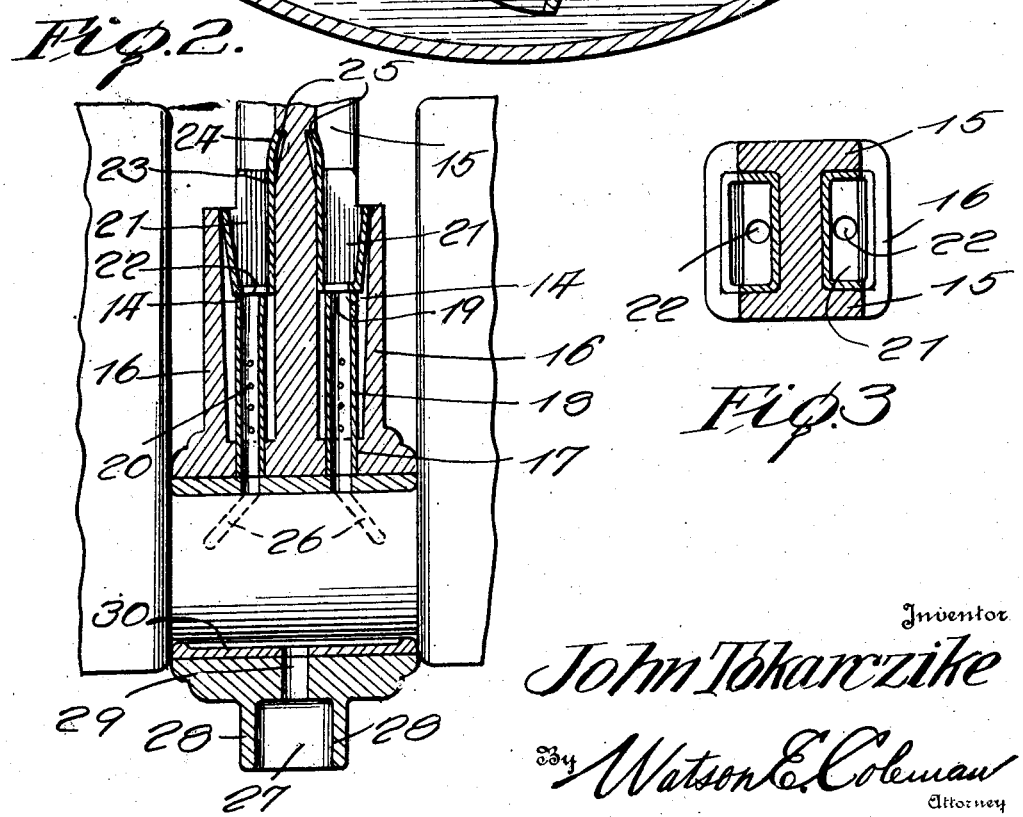
Fig.2.
Fig.3
Inventor
John Tokarczike
By Watson E. Coleman
Attorney Patented Mar. 3, 1925.

1,528,171

UNITED STATES PATENT OFFICE.

JOHN TOKARCZIKE, OF MONROE COUNTY, IOWA.

CONNECTING ROD.

Application filed August 11, 1923. Serial No. 656,784.

*To all whom it may concern:*

Be it known that I, JOHN TOKARCZIKE, a citizen of the United States, residing at Monroe County, in the county of Monroe and State of Iowa, have invented certain new and useful Improvements in Connecting Rods; of which the following is a specification, reference being had to the accompanying drawings.

This invention relates to improvements in connecting rods and has for an important object thereof the provision of a self-lubricating connecting rod.

It is well known to those familiar with the art that in many internal combustion engines of the vertical type the connecting rods depend for their lubrication upon the splash system. By this system the quantity of oil is stored in the sump of the engine into which the rods dip during the rotation of the crank shaft, with the result that the oil is splashed upon the connecting rod and transmitted to the bearing. This method of oiling frequently results in bearing trouble for when the bearings for any reason become overheated they engage the connecting rods so tightly that oil cannot be properly distributed thereto, particularly when the oil depends for its entry upon the space between the connecting rod and the crank shaft, which is usually about 1/2000". Furthermore, when the vehicle in which the engine is employed is longitudinally tilted, as in climbing or descending a hill, oil has a tendency to move from one end of the sump to the other with the result that certain of the bearings are over-lubricated whereas the remaining bearings do not receive a sufficient amount of lubrication. An important object of this invention accordingly becomes to provide a connecting rod having means for storing oil and delivering the same to the lower end bearing thereof, so that the bearing is at all times provided with oil and tendency of the same to overheat and freeze upon the connecting rod is to a large extent eliminated.

A further and more specific object of the invention is to provide a connecting rod having immediately above the lower end bearing thereof pockets for receiving and storing oil, together with means for delivering oil to the oil grooves of the bearing.

A further object of the invention is to provide a device of this character in which the pockets are so constructed that while oil may readily enter therein, it cannot be thrown from the pocket and accordingly the pocket will remain filled with oil at all times.

A still further object of the invention is to provide means for assisting in both the lubrication of the bearing and in the splashing of the oil, so that a sufficient splash is created to insure a filling of the connecting rod pockets.

These and other objects I attain by the construction shown in the accompanying drawings wherein for the purpose of illustration is shown a preferred embodiment of my invention and wherein:—

Figure 1 is a transverse vertical sectional view taken through a bearing constructed in accordance with my invention;

Figure 2 is a longitudinal sectional view; and

Figure 3 is a section taken through the connecting rod looking down upon the bearing.

Referring now more particularly to the drawings, the numeral 10 indicates the shank of a connecting rod, 11 the lower end bearing thereof which is formed in an upper section 12 integral with the shank and a lower section 13 bolted or otherwise secured thereto, the lower end bearing being adapted, as is well known, for the reception of the crank shaft of the engine. In accordance with my invention I form at opposite sides of the shank of the bearing, immediately above the upper section 12 of the bearing, pockets 14 for the reception of oil.

In the ordinary construction employed, connecting rod shanks have formed at the sides thereof and more particularly at the edges of the sides outstanding flanges 15. In forming the pocket 14 I employ the flanges 15 to form the sides of the pocket and the shank proper to form the inner wall of the pocket, the flanges 15 being connected by a wall 16 secured at its side edges to the flanges 15 and at its lower edge to the upper section 12 of the bearing in spaced relation to the shank 10. In the lower end of the pocket 14 I form an opening 17 in which is engaged the lower end of a pipe 18, the upper end of which is closed as indicated at 19. The pipe 18 terminates short of the upper end of the pocket 14 and that portion thereof extending into the pocket is formed to provide a screen, being shown in the present instance as provided with a plurality of minute openings 20. In conjunction with the pocket I provide a false pocket 21, the lower end of which is designed to engage against the upper end of the pipe 18 to be supported thereby. This false pocket 21 is shaped to closely fit against the walls of the pocket 14 at the upper end thereof and is provided at its lower end with an opening 22 affording access to the pocket 14. Any suitable means may be provided for maintaining the false pocket 21 in position. In the present instance I have disclosed this pocket as being provided with an upward extension 23 having at its end a flexible tongue 24 which may be engaged in a notch 25 formed in the wall of the connecting rod shank.

As hereinbefore stated, one of the pockets 14 may be formed at each side of the connecting rod and the pipes leading from the pocket 14 will connect with oil grooves 26 formed in the bearing face. It will be seen that oil entering the false pockets 21 will pass through the openings 22 in the bottom thereof into the pockets 14 and that escape from the pockets 14 will be prevented by the false pocket 21, so that the oil is retained in the pockets 14 until such time that it is employed. The screen formed by the minute apertures of the pipe 18 will prevent any dirt which may enter the pockets from passing to the bearings and accordingly only clean oil will be delivered thereto. When repairs are made to the engines the false pockets 21 may be removed and the pockets 14 cleansed to remove collected dirt and sediment. The amount of oil which will collect in the pockets 14 will be sufficient to lubricate the same for a considerable period and accordingly damage which otherwise might result to the engine during traveling on long hills will be avoided. Furthermore, if the oil is allowed to attain too low a level in the sump the lubrication will be provided for the bearings for a considerable period.

It will, of course, be obvious that the ordinary connecting rod, while splashing a considerable amount of oil, will not splash sufficient oil to keep the pockets of the type described filled at all times and I accordingly provide upon the lower bearing section 13 of the bearing a depending flange 27, which upon rotation of the engine will dip into the oil of the sump and throw the same against the walls of the cylinder from which it may drip to engage in the pockets 14. I further provide from the side edges of the flange 27 other flanges 28 combining with the flange 27 to form upon the lower surface of the bearing a scoop. It will be obvious that oil striking the flange 27 will have a tendency to spread and move upwardly along the flange. These side flanges, therefore, prevent the loss of a considerable amount of oil which would otherwise be splashed and in addition cause the oil to be forced against the lower surface of the lower bearing section 13. Through this bearing section I form an opening 29, which opening communicates with a longitudinal groove 30 formed in the bearing surface of the lower bearing section and a portion of oil forced against the lower face thereof will accordingly be delivered through such groove to the connecting rod. From the foregoing it will be obvious that by the use of a bearing constructed in accordance with my invention, burning of the bearings will be to a great extent eliminated and a constant supply of oil to the bearing practically assured. It will furthermore be obvious that the construction hereinbefore set forth is capable of a certain range of change and modification without in any manner departing from the spirit of my invention and I accordingly do not limit myself to such specific structure except as hereinafter claimed.

I claim:

1. The combination with a connecting rod having a bearing, the rod having an oil pocket formed therein and communicating with the bearing, the pocket having an open upper end, of a false pocket disposed within said pocket and closing the upper end thereof, said false pocket having an opening formed in the lower end thereof and communicating with the first named pocket.

2. The combination with a connecting rod having a bearing, the rod having an oil pocket formed therein, the oil pocket having an open upper end, of a tube carried by the bearing and communicating with the bearing surface thereof having its end portion extending into the oil pocket and provided with a plurality of minute openings permitting oil from the pocket to pass therethrough to the bearing.

3. The combination with a connecting rod having a bearing, the rod having an oil pocket formed therein, the oil pocket having an open upper end, of a tube carried by the bearing and communicating with the bearing surface thereof having its end portion extending into the oil pocket and provided with a plurality of minute openings permitting oil from the pocket to pass therethrough to the bearing, the upper end of said tube terminating short of the upper end of the pocket and being closed.

4. The combination with a connecting rod having a bearing, the rod having an oil pocket formed therein, the oil pocket having an open upper end, of a tube carried by the bearing and communicating with the bearing surface thereof and having its end portion extending into the oil pocket and provided with a plurality of minute openings permitting oil from the pocket to pass therethrough to the bearing, the upper end of said tube terminating short of the upper end of the pocket and being closed, and a false pocket disposed within the upper end of said pocket to close the upper end thereof, said false pocket having an opening formed in the lower end thereof permitting oil to pass therefrom to the first named pocket.

5. The combination with a connecting rod having a bearing, the rod having an oil pocket formed therein, the oil pocket having an open upper end, of a tube carried by the bearing and communicating with the bearing surface thereof and having its end portion extending into the oil pocket and provided with a plurality of minute openings permitting oil from the pocket to pass therethrough to the bearing, the upper end of said tube terminating short of the upper end of the pocket and being closed, and a false pocket disposed within the upper end of said pocket to close the upper end thereof, said false pocket having an opening formed in the lower end thereof permitting oil to pass therefrom to the first named pocket, and means carried by said false pocket and engaging the connecting rod to maintain said false pocket in position in the first named pocket.

6. A connecting rod having a bearing, the rod having upon its outer face an oil pocket having an open upper end formed therein, the lower end of the pocket communicating with the bearing, and removable means at the upper end of the pocket forming an auxiliary pocket for the reception of oil, said removable means closing the upper end of the main pocket and being provided with an opening communicating with the pocket.

7. The combination with a connecting rod having a bearing and provided at its sides with outstanding flanges, of a member connecting said flanges to one another and connected at its lower end to the bearing and combining therewith to form upon the side of the connecting rod an oil pocket the lower end of which is formed by the bearing, the bearing having an opening formed therein for passage of oil from the pocket to the bearing face thereof, and a false pocket disposed within said pocket and closing the upper end thereof, said false pocket having an opening formed in the lower end thereof and communicating with the first named pocket.

8. A connecting rod having a bearing, the rod having upon its outer face an oil pocket having an open upper end formed therein, the lower end of the pocket communicating with the bearing, and a baffle between the upper and lower ends of the pocket preventing splashing of oil from the pocket and permitting transmission of oil from the upper end of the pocket to the lower end thereof.

9. A connecting rod having a bearing, the rod having upon its outer face an oil pocket having an open upper end formed therein, the lower end of the pocket communicating with the bearing, and a baffle between the upper and lower ends of the pocket preventing splashing of oil from the pocket and permitting transmission of oil from the upper end of the pocket to the lower end thereof, said baffle being removable from the pocket.

In testimony whereof I hereunto affix my signature.

JOHN TOKARCZIKE.